United States Patent [19]

Brankin et al.

[11] Patent Number: 5,627,753
[45] Date of Patent: May 6, 1997

[54] METHOD AND APPARATUS FOR RECORDING DATA ON COCKPIT VOICE RECORDER

[75] Inventors: William Brankin; Lev Freidin, both of Simi Valley, Calif.

[73] Assignee: Patriot Sensors and Controls Corporation, Clawson, Mich.

[21] Appl. No.: 494,798

[22] Filed: Jun. 26, 1995

[51] Int. Cl.$^6$ .................................................. G06F 17/40
[52] U.S. Cl. ........................... 364/424.04; 364/424.06; 369/21
[58] Field of Search ................ 364/424.04, 424.06; 360/5; 369/21

[56] References Cited

U.S. PATENT DOCUMENTS

| | | | |
|---|---|---|---|
| 4,378,574 | 3/1983 | Stephenson | 360/71 |
| 4,635,030 | 1/1987 | Rauch | 340/52 F |
| 4,644,494 | 2/1987 | Muller | 364/900 |
| 4,656,585 | 4/1987 | Stephenson | 364/424 |
| 4,660,145 | 4/1987 | Hansen | 364/424 |
| 4,729,102 | 3/1988 | Miller, Jr. et al. | 364/424 |
| 5,193,046 | 3/1993 | Lemke et al. | 360/97.02 |
| 5,283,643 | 2/1994 | Fujimoto | 348/143 |

OTHER PUBLICATIONS

J. Douglas Bogle, *U.S. Coast Guard HH–65A Helicopter Avionics Block Upgrade #2*, Proceedings IEEE/AIAA 11th Digital Avionics Systems Conference, Seattle WA Oct. 5–8, 1992, pp. 205–209.

*Primary Examiner*—Michael Zanelli
*Attorney, Agent, or Firm*—Young & Basile, P.C.

[57] ABSTRACT

A spare voice channel on a cockpit voice recorder (CVR) is used to record flight data. Data from an accelerometer and other sensors in an aircraft are digitized and collected by a microprocessor once each second and are collated and arranged in an industry standard format, and an encoder converts the formatted data into an industry standard code for recording on the CVR. During transmission of data to the CVR, fresh data is collected for the next transmission.

11 Claims, 3 Drawing Sheets

| 1 SYNCH WORDS | 2 | 3 | 4 VERTICAL ACCEL. | 5 LONG ACCEL. | 6 LATERAL ACCEL. | 7 | 8 FREQ. ENGINE #1 |
|---|---|---|---|---|---|---|---|
| 9 MAGNETIC HEADING | 10 INDICATED AIRSPEED | 11 | 12 VERTICAL ACCEL. | 13 | 14 | 15 | 16 |
| 17 | 18 | 19 ALTITUDE COARSE SYNCH 0 | 20 VERTICAL ACCEL. | 21 LONG ACCEL. | 22 LATERAL ACCEL. | 23 | 24 |
| 25 | 26 | 27 | 28 VERTICAL ACCEL. | 29 | 30 | 31 | 32 |
| 33 | 34 | 35 | 36 VERTICAL ACCEL. | 37 LONG ACCEL. | 38 LATERAL ACCEL. | 39 | 40 |
| 41 | 42 | 43 | 44 VERTICAL ACCEL. | 45 | 46 | 47 | 48 |
| 49 | 50 | 51 | 52 VERTICAL ACCEL. | 53 LONG ACCEL. | 54 LATERAL ACCEL. | 55 | 56 |
| 57 FRAME COUNT | 58 ELECTRIC ALTITUDE FINE | 59 | 60 VERTICAL ACCEL. | 61 | 62 | 63 | 64 |

FIG - 3

METHOD AND APPARATUS FOR RECORDING DATA ON COCKPIT VOICE RECORDER

FIELD OF THE INVENTION

This invention relates to the recording of aircraft flight data and particularly to a method and apparatus for such recording on a cockpit voice recorder.

BACKGROUND OF THE INVENTION

It is the practice in most commercial and military aircraft to record information in crash survivable modules. A cockpit voice recorder (CVR) maintains a running record of pilot conversation while a digital flight data recorder (DFDR) maintains a record of flight data. These records are useful in analyzing the causes of aircraft accidents. The DFDR is both very expensive and quite heavy, but is not very significant compared to the cost and weight of a large craft.

In light aircraft, on the other hand, the DFDR is unacceptable in both cost and weight, although it is common to use a CVR in small craft, both fixed wing and rotary wing. Still it is desirable to have a crash survivable record of at least some basic flight data in the event of an incident requiring investigation. Preferably a substantial amount of data should be saved since the more information available in an investigation, the higher the chances of an early, accurate assessment of an accident and prevention of a repetition. CVRs do not fulfill this requirement alone and in some cases are of no or limited value. They should be used in conjunction with actual flight data, a combination which has been proven to save lives as well as aircraft.

Thus since the CVR already has a crash survivable module, it is desirable to use that hardware for storing flight data, thereby avoiding the expense of a DFDR as well as the extra weight. A limited capability has already been accomplished by encoding a single parameter data on a carrier frequency superimposed over the flight deck audio. This approach affords very limited flight information and has the potential of interfering with the voice recordings.

SUMMARY OF THE INVENTION

It is therefore an object of the invention to store flight data in a crash survivable manner without a dedicated flight data recorder and without compromising the audio recordings on a cockpit voice recorder. A further object is to employ the cockpit voice recorder to store flight data in a manner which cannot interfere with the voice recordings.

The CVR used in most aircraft typically has four audio channels, one channel for flight deck background sounds, two channels being used for pilot voice recording and the fourth channel being a spare. In this invention the flight data is collected, collated into a data stream having a desired format, encoded in an industry standard code and transmitted at a voice band frequency to the CVR for recording on the spare channel.

The apparatus for collecting and processing the data is contained in the same housing which holds the flight accelerometer. Data for vertical, longitudinal and lateral acceleration are selectively passed by a multiplexer, digitized and serially fed to a microprocessor. Other analog data from external sensors such as altitude, heading and air speed are also selectively passed by another multiplexer, digitized and serially fed to the microprocessor. The microprocessor addresses both of the multiplexers to control the data sequence. Frequency data representing engine thrust or torque is converted to digital form by a counter and sent to the microprocessor, or alternatively is directly fed to the timer system of the microprocessor. The microprocessor collates the data into the desired format which conforms to industry standards for flight data recordings, and sends the data stream to an encoder which converts the data to a signal in the voice frequency band for recording on the CVR. The data is arranged in a 64 word format and transmitted at 64 words per second so that fresh data is collected and recorded every second. The industry standard referred to herein is a series of specifications of ARINC (Aeronautical Radio, Inc.) which are commonly complied with in the design of aircraft communication devices.

BRIEF DESCRIPTION OF THE DRAWINGS

The above and other advantages of the invention will become more apparent from the following description taken in conjunction with the accompanying drawings wherein like references refer to like parts and wherein:

FIG. 3 is a chart illustrating the data format for recording data on the CVR according to the invention.

DESCRIPTION OF THE INVENTION

The ensuing description is directed to a preferred embodiment of the invention, although it should be recognized that other implementations within the spirit of the invention are likely to be made. In general, the invention greatly enhances the availability of useful flight information following a crash by making available a way to secure such data at very low expense, i.e., without using a digital flight data recorder. ARINC specifications for data communication are adhered to so that the circuitry will be compatible with aircraft equipment from other manufacturers, and the data is compatible with standard ground equipment.

The CVR used in most aircraft typically has four audio channels, one channel for flight deck background sounds, two channels being used for pilot voice recording and the fourth channel being a spare. In this invention flight data is collected from various flight instruments and recorded on the spare channel. In some cases the CVR has the ability to record audio within two separate solid state memory module sections. The first is the traditional half hour four channel "high Quality" section where each channel is recorded independently of the others. The second has a single channel sufficient for two hours of recording and is generally used to record a mixture of all four inputs. With a very minor modification of the CVR to disconnect three of the four inputs, the two hour section can be made available to record the flight data only. In the context of this specification the term "spare voice channel" shall means either the traditional half hour audio channel in the first section or the two hour section.

Figure 1:
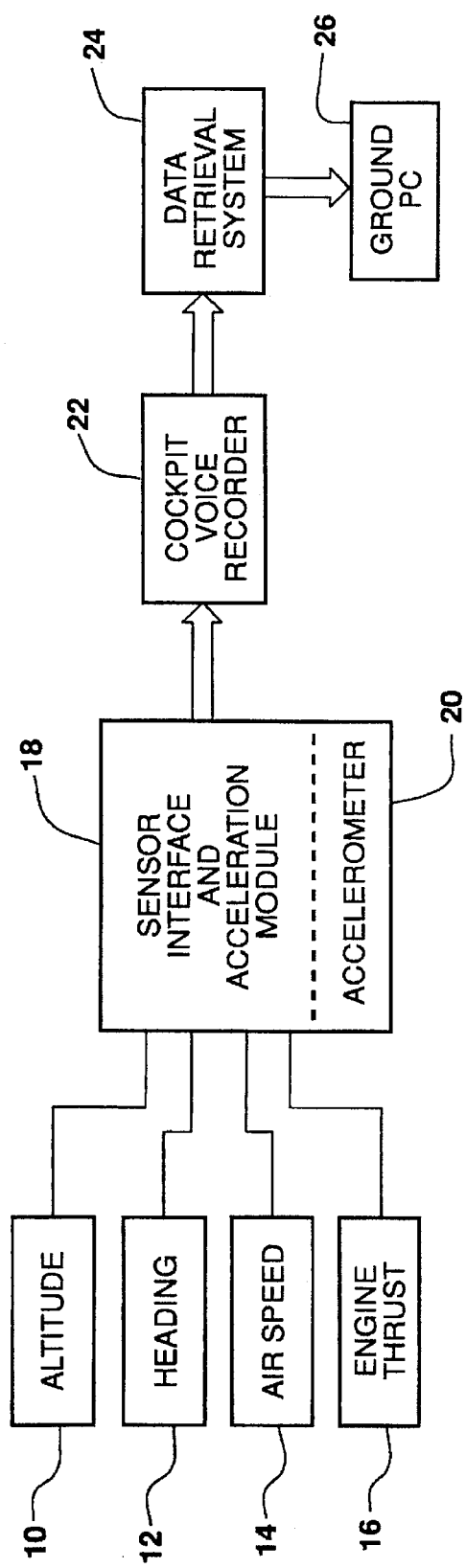
FIG. 1 is a block diagram of a flight data accumulation, recording and retrieval system according to the invention.

Referring to FIG. 1, synchro/resolvers 10, 12 and 14 for measuring altitude, heading and airspeed, respectively, as well as an engine thrust transducer 16 provide inputs to a sensor interface and acceleration module 18. The module 18 is contained within a lightweight aluminum housing and includes a tri-axial accelerometer 20 along with interface circuitry. The interface accumulates flight data, collates it into a standardized format, and encodes the data in a form which is not only useful for recording on a CVR but also which accords with ARINC standards to facilitate interpretation by ground facilities. The output is directed to a solid state CVR 22 for recording on a spare voice channel. In the event that data retrieval becomes necessary, the CVR data is delivered to a data retrieval system 24 which includes a decoder for converting the data to a form which is standard for analysis at the ground station using a personal computer 26.

Figure 2:
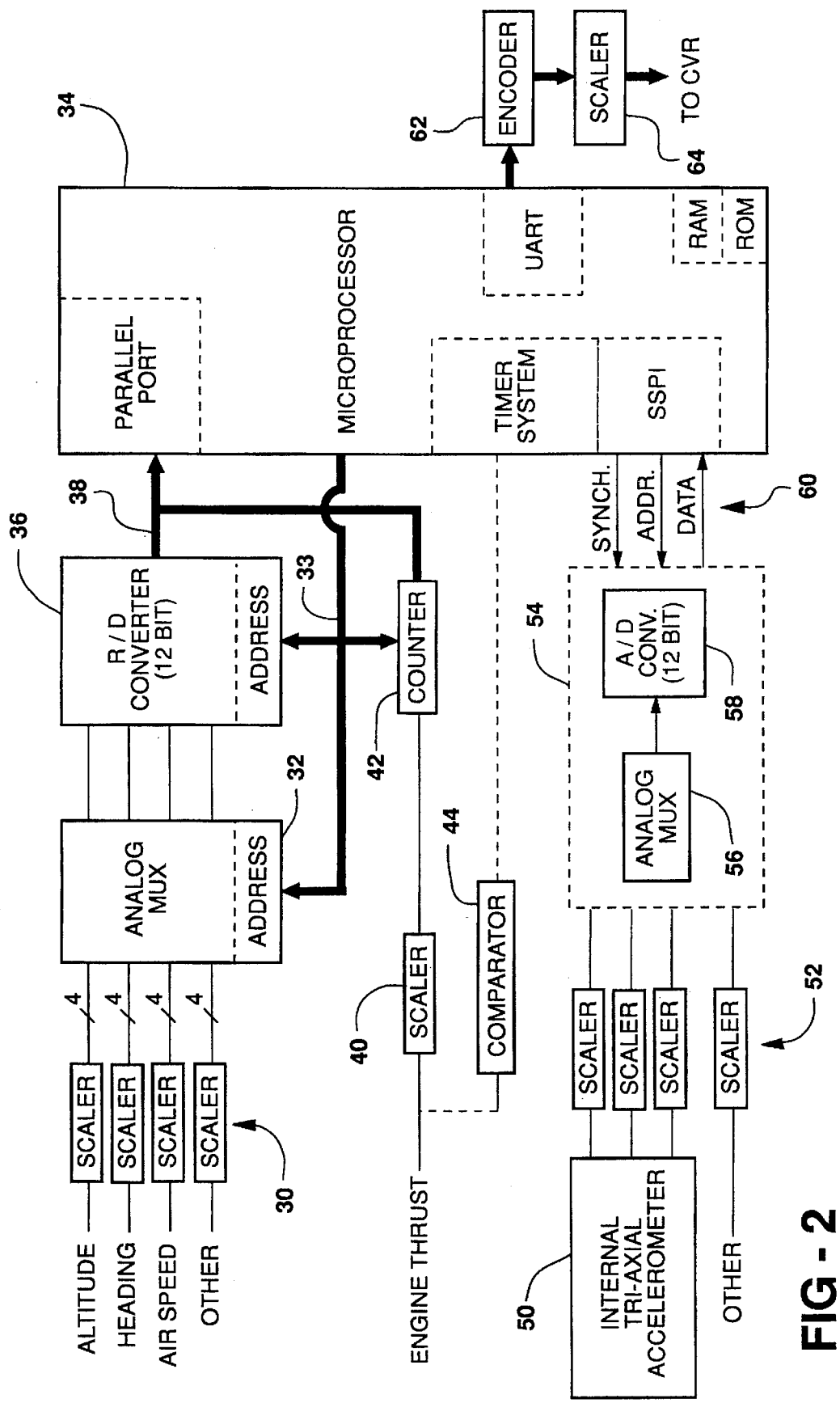
FIG. 2 is a diagram of the sensor interface of FIG. 1 according to the invention.

FIG. 2 depicts the circuitry of the sensor interface and acceleration module. Each of the altitude, heading and airspeed sensors are coupled through respective scalers 30 to an analog multiplexer 32. These scalers and other scalers mentioned below comprise voltage dividers or amplifiers, for example, to adjust the signal level to that which is suitable for the next stage. Other resolver instruments, e.g. pitch trim and control column, may also be connected to the multiplexer in the same manner. The resolver outputs are each indicated in the drawing to comprise four lines but more lines can be accommodated as well. The multiplexer 32 is addressed over bus 33 by a microprocessor 34 to selectively couple the analog resolver signals to a 12 bit resolver-to-digital (R/D) converter 36, also addressed by the bus 33. The digital data from the R/D converter 36 is carried by a data bus 38 to a parallel port of the microprocessor 34.

The engine thrust signal is presented as a frequency. If the frequency is in a range above 5 kHz, the signal is fed through a scaler 40 to a counter 42 which is under control of the microprocessor via the bus 33. The counter output, representing thrust, is supplied by the data bus 38 to the microprocessor. In the case of thrust transducers which produce frequencies below 5 kHz, an alternative circuit is used as shown in dotted lines. The thrust signal is fed to a comparator 44 having its output connected to a timer port of the microprocessor where the timer system will determine the comparator period on the basis of input capture times, and thereby determine an engine thrust parameter.

The internal tri-axial accelerometer 50 produces three outputs: vertical, longitudinal and lateral acceleration. The outputs of instruments yielding outside air temperature, rudder position or other parameters may also be included. Each output is fed through a scaler 52 to a converter chip 54 which includes an analog multiplexer 56 and a 12 bit analog-to-digital (A/D) converter 58. This chip 54 communicates with a synchronous serial peripheral interface (SSPI) of the microprocessor 34 by lines 60 for a synch signal, an address, and data. By reason of the 12 bit converters 36 and 58, as well as the management of the engine thrust input, each parameter is reported with precision to the microprocessor.

The microprocessor 34 determines the time of receipt of each parameter by controlling the inputs via bus 33 and lines 60, stores each input in RAM, collates the parameters to establish a desired order of reporting, and issues the complete set of output data each second in a preferred format. Input and output functions are occurring simultaneously so that while a set of data is being transmitted, the data is being acquired for the next set. In this way there is a delay of just one second between data acquisition and its transmission. The data is sent by an universal asynchronous receiver transmitter (UART) to an encoder 62 which transforms the UART output to a code form which meets both ARINC standards and the frequency specification of the CVR. A scaler 64 processes the encoder output to provide the interface 18 output to the CVR 22.

While the microprocessor is programmable to construct various data formats, the preferred format is that shown in FIG. 3 wherein a serial signal of 64 words in a frame includes the complete set of data to be transmitted in one second. This format conforms to ARINC 542A and 573 data structures. The first word is reserved for synchronization and each subsequent word is either empty or is reserved for a particular parameter. Each word is 12 bits to embody all the information for each parameter. Two words are used for altitude which has coarse and fine components. Vertical acceleration is entered at the 4th word and every 8th word thereafter to appear 8 time in each frame. The longitudinal acceleration and the lateral acceleration each occur four times, beginning with the 5th and 6th words. All other parameters are entered once. It will be apparent from the empty words that the format is able to accommodate additional parameters as desired. Since certain parameters are reported more than once in each frame, the microprocessor is programmed to sample them more than once each second as needed while other parameters will be sampled only once.

Figure 4:
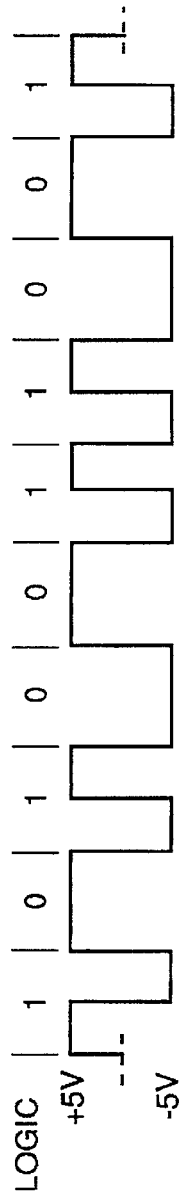
FIG. 4 is a waveform diagram illustrating a preferred code for data recording.

It is preferred that the data be encoded in a code authorized by ARINC 573 specifications. These are, for example, the Harvard bi-phase code and the NRZ code. The NRZ code simply comprises a high voltage level for logic "1" and a low level for logic "0". The Harvard bi-phase code, shown in FIG. 4, changes level at the beginning of each bit and remains at the new level throughout the bit period for a logic "0", and changes level in mid-period for logic "1". The high and low voltage levels are +5 volts and -5 volts according to the specifications and are adjusted by the scaler to suit the CVCR requirements. The data is transmitted at 64 words or 768 bits per second, thus readily conforming to CVR frequency requirements which commonly have a frequency range of 100 to 4,500 Hz.

It will be noted that the method of recording flight data on a solid state CVR comprises collecting data from flight instruments, digitizing the data, collating the data and arranging the data into a format, encoding the data and transmitting the data to a CVR and recording on the spare voice channel. Both the data code and the format accord to industry standards as set by ARINC specifications for previous flight data recording environments. Moreover the encoded data is transmitted at a rate which is preferred for commercially available CVRs.

The described method and apparatus result in an efficient, inexpensive light weight system for securing flight data in a crash survivable unit for analysis when desired. The invention is carried out using industry standards of digital codes and data formats and has no deleterious effect on voice recordings or any other information collected by a CVR.

The embodiments of the invention in which an exclusive property or privilege is claimed are defined as follows:

1. A system for recording aircraft flight data developed by instruments comprising:

a cockpit voice recorder having a plurality of audio channels, at least one of the audio channels being a voice channel for the recording of cockpit voice communications and one of the channels being reserved for data;

means for collecting flight data from the instruments;

a microprocessor for receiving collected flight data and for serially presenting the collected flight data in an organized format;

means for encoding and scaling the formatted data and transmitting the scaled encoded data in a voice frequency band to the cockpit voice recorder; and means for recording the transmitted data on the reserved channel of the voice recorder separately from the cockpit voice communications.

2. The invention as defined in claim 1 wherein the means for collecting flight data includes means under control of the microprocessor for sending the collected data to the microprocessor.

3. The invention as defined in claim 1 wherein the means for collecting flight data includes means for digitizing the collected data; and means for sending the digitized data to the microprocessor.

4. The invention as defined in claim 1 wherein the means for encoding comprises an encoder for converting the formatted data from the microprocessor to an industry standard code.

5. The invention as defined in claim 1 wherein the organized format comprises a fixed number of words and data for each parameter is assigned to at least one specific word.

6. A module for sensing accelerations of an aircraft frame and recording flight data related to the accelerations on a cockpit voice recorder, the module comprising a housing for mounting on the aircraft frame, the housing containing:

an accelerometer responsive to motion of the aircraft frame;

a signal processing circuit for receiving and digitizing data from the accelerometer;

a microprocessor for controlling the order of processing the digitized data and arranging the digitized data in a standard format; and an encoder coupled to the microprocessor and to the voice recorder for encoding the formatted data for transmission to and recording on a spare voice channel of the cockpit voice recorder.

7. The invention as defined in claim 6 wherein the housing further contains another signal processing circuit for receiving flight data from other instruments and for digitizing such data for input to the microprocessor, whereby all the digitized data is formatted and transmitted to the recorder.

8. A method of recording flight data on a cockpit voice recorder having at least one audio channel for the recording of cockpit voice communications and a spare audio channel, the method comprising the steps of:

collecting data from flight instruments representing a plurality of parameters;

ordering the collected data into a digital format comprising a number of words, at least some of the words corresponding to the parameters;

encoding the formatted data in an industry standard code at a frequency consistent with audio channel limitations;

transmitting the encoded data to the cockpit voice recorder; and recording the transmitted encoded data on the spare audio channel separately from the cockpit voice communications.

9. The invention as defined in claim 8 wherein the format comprises 64 words in series, and the step of ordering the collected data comprises:

collating the data; and assigning each parameter to at least one of the words.

10. The invention as defined in claim 8 wherein:

during the step of transmitting the encoded data, the step of collecting the data is repeated for use in a subsequent transmission.

11. The invention as defined in claim 8 wherein the format comprises a fixed number of words in series, and wherein:

the steps of claim 8 are repeated each second, whereby new data is recorded each second.

* * * * *